US008122664B2

(12) United States Patent
Ben-Daat et al.

(10) Patent No.: US 8,122,664 B2
(45) Date of Patent: Feb. 28, 2012

(54) INSULATING AND WATERPROOFING MEMBRANE

(75) Inventors: Dan Ben-Daat, Sharon, MA (US); Stanley P. Graveline, Sharon, MA (US)

(73) Assignee: SIKA Technology AG, Zurich (CH)

( * ) Notice: Subject to any disclaimer, the term of this patent is extended or adjusted under 35 U.S.C. 154(b) by 356 days.

(21) Appl. No.: 12/205,517

(22) Filed: Sep. 5, 2008

(65) Prior Publication Data

US 2009/0064618 A1 Mar. 12, 2009

Related U.S. Application Data

(60) Provisional application No. 60/993,326, filed on Sep. 11, 2007.

(51) Int. Cl.
*E04D 11/02* (2006.01)
*E04D 5/10* (2006.01)

(52) U.S. Cl. ........................................ 52/408; 52/309.8

(58) Field of Classification Search ................ 52/309.4, 52/309.5, 309.6, 309.8, 309.9, 408, 411
See application file for complete search history.

(56) References Cited

U.S. PATENT DOCUMENTS 3,125,479 A * 3/1964 Finan .......................... 156/300
3,373,074 A * 3/1968 Eustachio et al. ......... 428/313.9
3,726,754 A * 4/1973 Coglianese et al. ....... 428/317.7
3,971,184 A * 7/1976 Van Wagoner ............... 428/201
4,719,723 A * 1/1988 Van Wagoner .................. 52/15
6,418,687 B1 * 7/2002 Cox ........................... 52/309.4
6,586,080 B1 * 7/2003 Heifetz ........................ 428/198
6,656,557 B2 * 12/2003 Phillips ...................... 428/40.3
6,769,215 B1 * 8/2004 Carkner ......................... 52/411
6,864,195 B2 * 3/2005 Peng ............................. 442/41
6,877,288 B2 * 4/2005 Shirota .......................... 52/416
7,410,683 B2 * 8/2008 Curro et al. .................. 428/133
2003/0054127 A1 * 3/2003 Heifetz ...................... 428/40.1
2004/0076786 A1 * 4/2004 Naipawer et al. ........... 428/40.3
2004/0161569 A1 * 8/2004 Zanchetta et al. .......... 428/40.1
2006/0286343 A1 * 12/2006 Curro et al. ................ 428/131
2007/0077838 A1 * 4/2007 Binkley et al. ............... 442/286
2008/0104917 A1 * 5/2008 Whelan et al. ................. 52/408
2008/0307734 A1 * 12/2008 Whelan et al. ................. 52/411
2008/0309014 A1 * 12/2008 Whelan et al. ................ 277/316
2009/0113841 A1 * 5/2009 Whelan et al. ............... 52/741.4

FOREIGN PATENT DOCUMENTS

| | | |
|---|---|---|
| DE | 24 43 453 | 3/1976 |
| GB | 1 369 326 | 10/1974 |
| GB | 2 105 256 | 3/1983 |
| WO | WO 98/31895 | 7/1998 |

* cited by examiner

*Primary Examiner* — Khoi Tran
*Assistant Examiner* — Jason Holloway
(74) *Attorney, Agent, or Firm* — Pandiscio & Pandiscio

(57) ABSTRACT

An insulating and waterproofing membrane for over-lying attachment to a foam insulation layer of material fixed to a roof or other structure, the membrane including a first layer of a flexible foam material for over-lying attachment to the foam insulation layer, a second layer of a fabric fixed to and over-lying the first layer, and a third layer comprising a waterproof outer skin affixed to and over-lying the second layer.

8 Claims, 2 Drawing Sheets

INSULATING AND WATERPROOFING MEMBRANE

CROSS-REFERENCE TO RELATED APPLICATION

This application claims priority from U.S. Provisional Patent Application 60/993,326, filed Sep. 11, 2007 in the names of Dan Ben-Daat and Stanley P. Graveline.

BACKGROUND OF THE INVENTION

1. Field of the Invention

The invention relates to insulating and waterproofing membranes for use on roofs and other surfaces, for providing improved insulation and waterproofing.

2. Description of the Prior Art

It is known to provide insulation and waterproofing structures 2 (FIG. 1) comprising a layer of foam insulation 4 and, overlaid thereon, a layer of waterproof material 6. The foam insulation layer 4 is provided with a desired R value, that is, the insulating value of the foam insulation layer. The higher the R value, the better the insulation provided. To provide a desired R value, more than a single layer of insulation may be provided.

The foam insulation layer 4 for roofing applications typically is applied in the form of rigid boards made of various types of foams and attached to a roof as a separate insulation layer. A layer of waterproof material 6 is thereafter overlaid onto the foam insulation board 4 and disposed over the foam insulation board 4.

Mechanical attachment systems for attaching the boards 4 to a roof or other structure S, particularly those that penetrate the boards, such as bolts, nails, or screws, along with gaps between boards, create "thermal bridges", which permit unrestricted heat flow, thereby diminishing the effective R values of the boards.

SUMMARY OF THE INVENTION

Accordingly, an object of the invention is to provide a flexible insulating and waterproofing membrane for application to the foam insulation boards 4, which elevates the R value of the foam insulation boards 4 alone and serves to eliminate or diminish the loss of heat through thermal bridging.

With the above and other objects in view, as will hereinafter appear, a feature of the present invention is the provision of a flexible insulating and waterproofing membrane for attachment to foam insulation boards disposed on a surface to be insulated and waterproofed, the flexible insulation and waterproofing membrane being adapted to be attached to the foam insulation boards.

In accordance with a further feature of the invention, there is provided an insulating and waterproofing membrane, as described immediately above, wherein the flexible insulation and waterproofing membrane comprises a first layer of flexible foam for over-lying and attaching to the foam insulation boards, a second layer of fabric over-lying and attaching to the first layer, and a third layer comprising a waterproof skin over-lying and fixed to the fabric layer.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
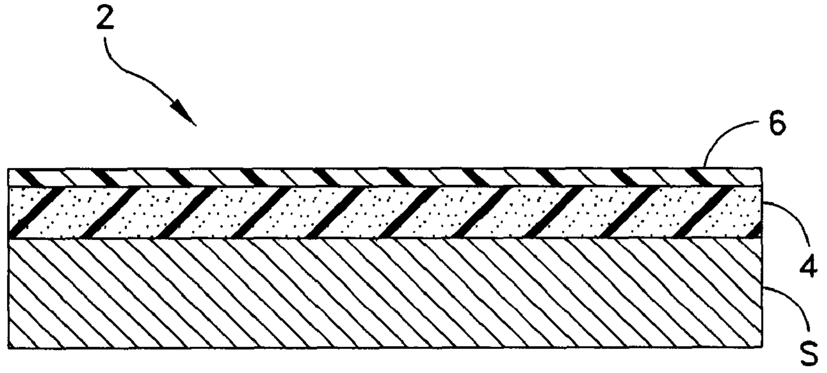
FIG. 1 is a sectional view of a prior art waterproofing and insulating board for disposition on a roof top or other structural surface.
Figure 2:
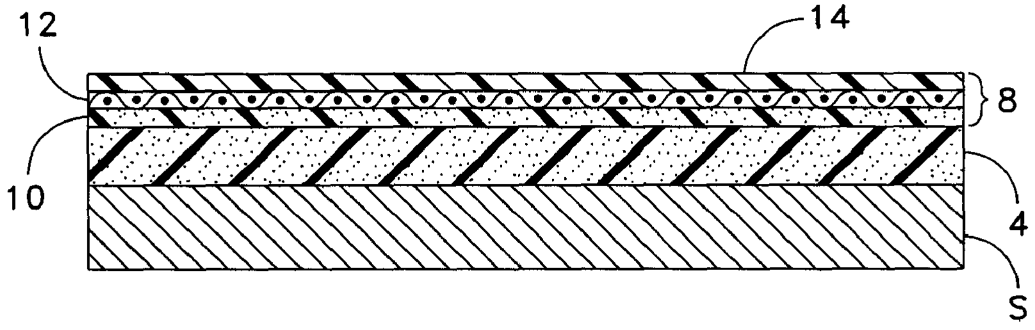
FIG. 2 is a sectional view illustrative of a waterproofing and insulating membrane embodying the features of the present invention, shown in combination with a prior art board generally of the type shown in of FIG. 1.

Referring to FIG. 2, there is shown an illustrative insulating and waterproofing membrane 8, for attachment to a foam insulation layer 4 attached to a roof, or other structure S, to be further insulated and waterproofed. The foam insulation layer 4 preferably is a thermoplastic or thermoset material produced in semi-rigid or rigid form as a board for application to the structure S, as by nails or adhesives. Appropriate thermoplastics include polyisocyanurate and polystyrene.

Figure 3:
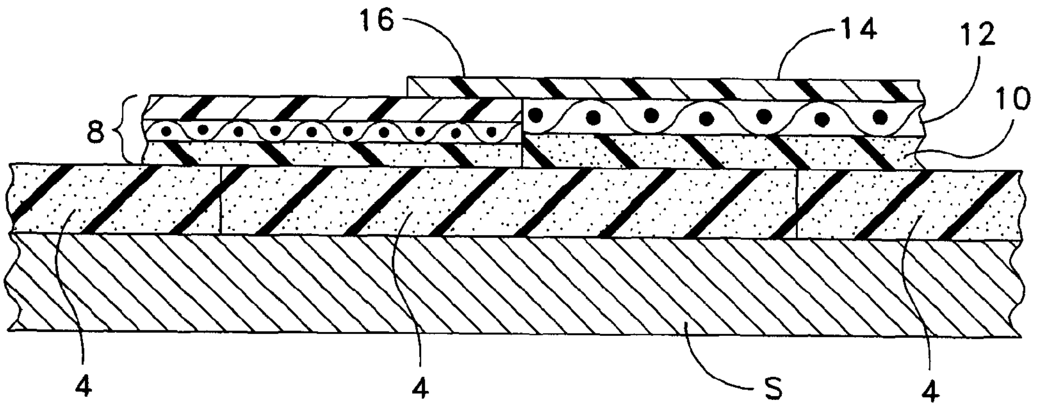
FIG. 3 is a sectional view similar to FIG. 2, but showing a selvedge feature of the invention.

In accordance with the invention, a flexible insulation layer 8 is adhesively or mechanically affixed to the foam insulation layer 4. The flexible insulation layer 8 includes first, second and third layers 10,12,14 bound together. The first layer 10 is of flexible foam of a thermoplastic or thermoset, open cell or closed cell material. The second layer 12 comprises a fabric material bound to the flexible foam layer 10. The fabric layer 12 comprises a selected one of a non-woven fabric and a woven fabric. The third layer 14 is a waterproof skin bound to and over-lying the second layer 12. The insulating and waterproof membrane 8 is about 10-30 mm in thickness. The membrane 8 is sufficiently flexible to be rolled and stored and transported in rolled form, and unrolled onto the foam insulation boards 4. The rolls (not shown) in one form include strips of layer 8 of a selected length and width. When the membrane 8 is unrolled onto the boards 4, there is little likelihood that seams between strips of membrane 8 will coincide with seams between boards 4. Further, the membranes 8 are each provided with a selvedge 16 (FIG. 3) which overlays an adjoining membrane strip, minimizing any open avenues for loss of heat or cooling. More particularly, the fabric material may be felt or of any selected barrier composite, including one of hollow fiber construction.

The flexible insulation layer 8, including the first, second and third layers 10, 12, 14 therein, exhibits a weight of about 5-40/oz./yd$^2$. The first layer 10 may be of closed or open cell foam.

In operation, a roof-top, or similar structural surface S, usually is first covered by the above-mentioned foam insulation boards 4 of a thickness sufficient to provide an R value computed by an architect, or the like, to afford heat and/or cooling, retention as required by the nature of the structure.

If, at this point, it is known that further insulation is required, the waterproofing skin 6 can be omitted and the insulation and waterproofing membrane 8, having as a component thereof the outer skin 14, can be applied directly to the foam insulation boards 4.

It will be apparent that the flexible insulation layer 8 may be attached directly to a roof or other structure S not provided with the insulation boards 4.

If the insulation boards 4 have previously been waterproofed by the addition thereto of the waterproofing skin 6, the membrane can be applied onto the skin 6.

As noted above, the membrane 8 is sufficiently flexible to be rolled and stored and shipped, and kept in the rolled condition until its use is called for. Whereupon, the roll is unrolled to position the membrane 8 for progressive attachment, as by adhesive, to the foam insulation board 4 or skin 6.

The membrane 8 provides an extra thickness of foam 10, and the fabric layer 12, thereby increasing the R value of the roof or structure S. The top-most skin 14 provides for waterproofing, whether or not there is in place a prior waterproofing skin 6.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A flexible insulating and waterproofing membrane comprising a thin pliable sheet of material for use on roofs and other surfaces and adapted for over-lying attachment to a structure surface or foam insulating layer of material mounted on a structure surface; the flexible insulating and waterproofing membrane comprising:

a first layer of a thermoplastic or thermoset flexible foam material for over-lying attachment to the structure surface or the foam insulating layer of material mounted on the structure surface;

a second layer of a fabric material affixed to and over-lying the first layer; and a third layer of a waterproof outer skin affixed to and over-lying the second layer;

wherein said second layer of fabric material is provided with a barrier composite, and is of hollow fiber construction, and wherein said third layer is provided with a selvedge portion extending beyond edges of said first and second layers for overlying a top portion of an adjacent membrane, the selvedge structure comprising an integral extension of said third layer beyond edges of said first and second layers; and wherein said sheet of material is 15-30 mm in thickness.

2. The flexible insulating and waterproofing membrane in accordance with claim 1, wherein said first layer of foam material is a selected one of open cell material and closed cell material.

3. The flexible insulating and waterproofing membrane in accordance with claim 1, wherein said sheet of material exhibits a weight of about 5-40 oz/yd$^2$.

4. The flexible and waterproofing membrane in accordance with claim 1, wherein the flexible insulating layer comprises the first, second and third layers fixed together to form the membrane independently of the structure and insulation mounted on the structure, and adapted to be applied to the structure or the insulation mounted on the structure.

5. The flexible and waterproofing membrane in accordance with claim 4, wherein the membrane is adapted to be rolled and stored and transported in rolled form, and unrolled onto the structure or insulation mounted on the structure.

6. The flexible and waterproofing membrane in accordance with claim 1, wherein said selvedge structure is adapted to diminish loss of heat through thermal bridging.

7. The flexible and waterproofing membrane in accordance with claim 1, wherein the foam insulation layer of material comprises foam insulation boards mounted on the structure surface and said membrane is adapted for attachment to the foam insulation boards disposed on the surface of the structure.

8. The flexible and waterproofing membrane in accordance with claim 1, wherein the membrane is less than 0.79 inch in thickness.

* * * * *